US012810196B2

(12) United States Patent
Rakshit

(10) Patent No.: US 12,810,196 B2
(45) Date of Patent: Nov. 24, 2026

(54) AUTO-ADAPTATION OF AI SYSTEM FROM FIRST ENVIRONMENT TO SECOND ENVIRONMENT

(71) Applicant: INTERNATIONAL BUSINESS MACHINES CORPORATION, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 17/460,494

(22) Filed: Aug. 30, 2021

(65) Prior Publication Data

US 2023/0063227 A1 Mar. 2, 2023

(51) Int. Cl.
*G06N 3/08* (2023.01)
*G06N 5/043* (2023.01)
*G06N 20/00* (2019.01)

(52) U.S. Cl.
CPC ............. *G06N 20/00* (2019.01); *G06N 5/043* (2013.01)

(58) Field of Classification Search
CPC ........ G06N 20/00; G06N 5/043; G06N 3/006; G06N 3/008
See application file for complete search history.

(56) References Cited

U.S. PATENT DOCUMENTS 7,562,019 B2 7/2009 Cohen
9,817,634 B2 11/2017 Gupta
11,747,145 B2 * 9/2023 Patnaikuni ......... G01C 21/3407 340/686.1
2005/0129194 A1 6/2005 Creamer
2014/0028712 A1 * 1/2014 Keating ................ G06T 19/006 345/633
2019/0258747 A1 * 8/2019 Milev ................. G06F 16/9032
2019/0317606 A1 * 10/2019 Jain ......................... G06F 3/167

(Continued)

OTHER PUBLICATIONS

Dalal, Dhairya. 2018. Socrates Sim: A Dialog Simulation Framework to Support Task Completion Dialog Research. Master's thesis, Harvard Extension School. (Year: 2018).*

(Continued)

*Primary Examiner* — Matthew Ell
*Assistant Examiner* — Jonathan J Kim
(74) *Attorney, Agent, or Firm* — Scully, Scott, Murphy & Presser, P.C.; Monchai Chuaychoo

(57) ABSTRACT

An embodiment for automatically adapting an artificial intelligence (AI) system from a first environment to a second environment is provided. The embodiment may include receiving a digital model associated with each user of a plurality of users. The embodiment may also include identifying one or more characteristics of the digital model. The embodiment may further include executing a simulation of movements and activities for the digital model. The embodiment may also include creating a set of commands to be asked by the digital model. The embodiment may further include providing the set of commands to an AI virtual assistant. The embodiment may also include in response to determining the AI virtual assistant is not able to execute each command, identifying the digital model for each user whose command was not able to be executed. The embodiment may further include recommending one or more corrective actions.

14 Claims, 7 Drawing Sheets

200

(56) References Cited

U.S. PATENT DOCUMENTS

| | | | | |
|---|---|---|---|---|
| 2019/0378516 | A1 | 12/2019 | Kline | |
| 2020/0100063 | A1* | 3/2020 | Jadav | H04W 4/02 |
| 2020/0105273 | A1* | 4/2020 | O'Donovan | G10L 15/30 |
| 2020/0260208 | A1* | 8/2020 | Schmidt | H04R 1/1041 |
| 2020/0310742 | A1* | 10/2020 | Cohen | G10L 21/034 |
| 2020/0320365 | A1* | 10/2020 | Arat | G06F 8/35 |
| 2021/0004414 | A1 | 1/2021 | Silverstein | |
| 2021/0065685 | A1* | 3/2021 | Hwang | G10L 15/063 |
| 2021/0081302 | A1* | 3/2021 | Reicher | G06N 3/045 |
| 2021/0109837 | A1* | 4/2021 | Rakshit | G06F 11/3476 |
| 2021/0109973 | A1* | 4/2021 | Brikis | G06N 3/08 |
| 2021/0248825 | A1* | 8/2021 | McBain | G06T 17/20 |
| 2022/0070232 | A1* | 3/2022 | Young | G06T 19/003 |

OTHER PUBLICATIONS

S. Katayama, A. Mathur, M. van den Broeck, T. Okoshi, J. Nakazawa and F. Kawsar, "Situation-Aware Emotion Regulation of Conversational Agents with Kinetic Earables," 2019 8th Conference on Affective Computing, Cambridge, UK, 2019, pp. 725-731, doi: 10.1109/ACII.2019.8925449. (Year: 2019).*

Disclosed Anonymously, "Method and system for VR based Context Testing Data Validation of any AI Voice Assistance System", IPCOM000264454D, Electronic Publication Date Dec 18, 2020, 6 Pages.

Hitti, "Samsung's Artificial Neon Humans are 'A New Kind of Life'", Dezeen, Jan. 15, 2020, 17 Pages. https://www.dezeen.com/2020/01/15/samsung-neon-star-labs-artificial-humans/.

Mell et al., "The NIST Definition of Cloud Computing", Recommendations of the National Institute of Standards and Technology, NIST Special Publication 800-145, Sep. 2011, 7 pages.

Siyavula, "The Doppler Effect with Sound", Physical Sciences Grade 12, Retrieved from Internet Aug. 27, 2021, 18 pages. https://intl.siyavula.com/read/science/grade-12/doppler-effect/06-doppler-effect-02.

* cited by examiner

400

AUTO-ADAPTATION OF AI SYSTEM FROM FIRST ENVIRONMENT TO SECOND ENVIRONMENT

BACKGROUND

The present invention relates generally to the field of computing, and more particularly to a system for automatically adapting an artificial intelligence (AI) system from a first environment to a second environment.

AI virtual assistants have become popular products in recent memory. On a consumer level, a user may provide a voice command and the AI virtual assistant may execute the command. For example, the user may ask the AI virtual assistant about breaking news stories in their area, or the user may request that an item be added to their shopping cart in an online account. On both a consumer and industrial level, these AI virtual assistants may also be used to control a variety of different devices, such as doorbell cameras, automobiles, and robotic factory equipment. In addition, facial and/or hand gestured may activate and cause the AI virtual assistant to perform certain tasks. As technology continues to improve, the demand for AI virtual assistants is expected to increase in the coming years.

SUMMARY

According to one embodiment, a method, computer system, and computer program product for automatically adapting an artificial intelligence (AI) system from a first environment to a second environment is provided. The embodiment may include receiving a digital model associated with each user of a plurality of users. The embodiment may also include identifying one or more characteristics of the digital model. The embodiment may further include executing a simulation of movements and activities for the digital model based on the one or more identified characteristics. The embodiment may also include creating a set of commands to be asked by the digital model in the simulation. The embodiment may further include providing the set of commands to an AI virtual assistant in the simulation. The embodiment may also include in response to determining the AI virtual assistant is not able to execute each command, identifying the digital model for each user whose command was not able to be executed.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
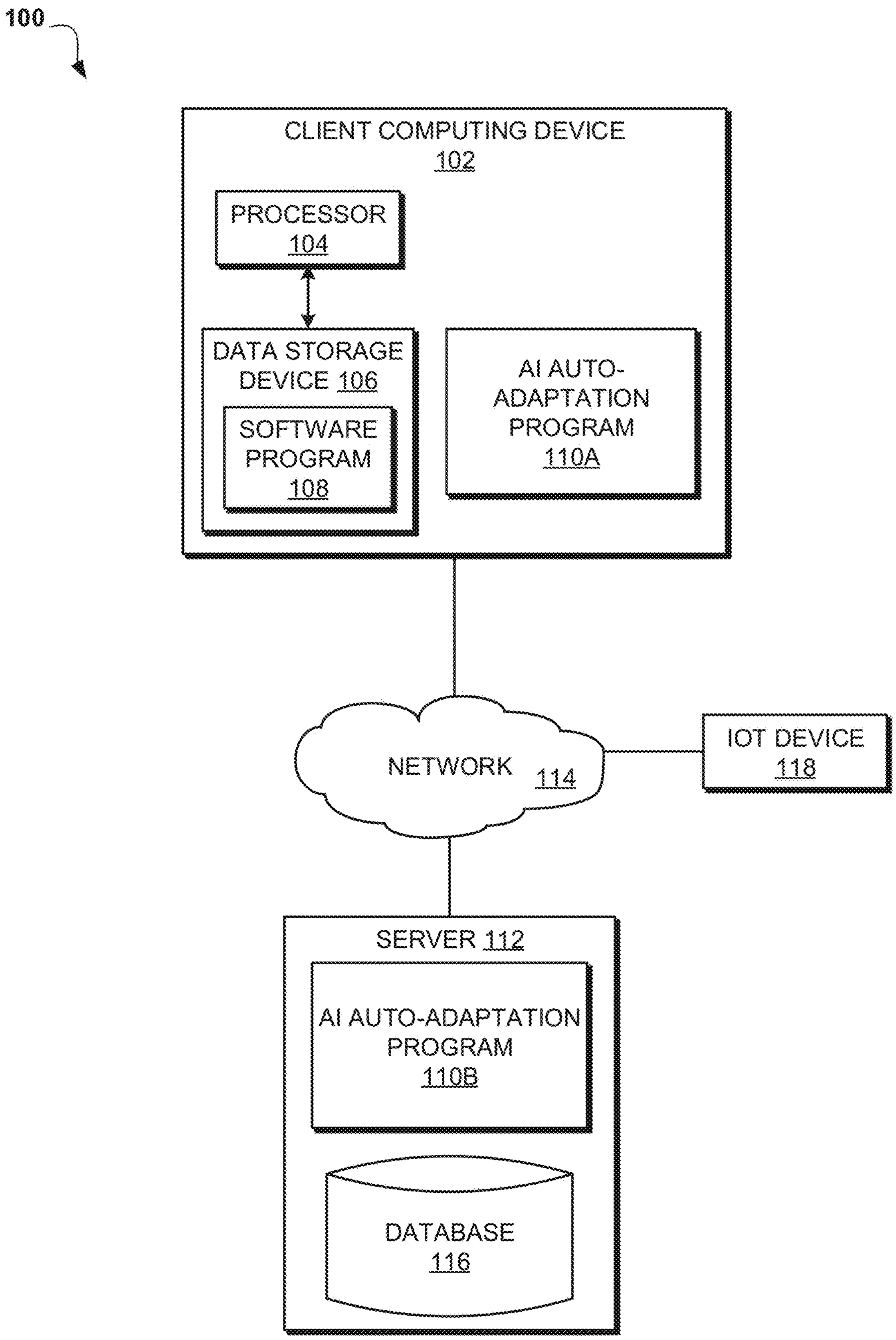
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for automatically adapting an artificial intelligence (AI) system from a first environment to a second environment. The following described exemplary embodiments provide a system, method, and program product to, among other things, execute a simulation of movements and activities for a digital model associated with a user and, accordingly, recommend a corrective action if an AI virtual assistant is not able to execute a command from the digital model. Therefore, the present embodiment has the capacity to improve the technical field of AI virtual assistants by automatically adapting a virtual assistant device when a deployment environment is different from a development environment.

As previously described, AI virtual assistants have become popular products in recent memory. On a consumer level, a user may provide a voice command and the AI virtual assistant may execute the command. For example, the user may ask the AI virtual assistant about breaking news stories in their area, or the user may request that an item be added to their shopping cart in an online account. On both a consumer and industrial level, these AI virtual assistants may also be used to control a variety of different devices, such as doorbell cameras, automobiles, and robotic factory equipment. In addition, facial and/or hand gestures may activate and cause the AI virtual assistant to perform certain tasks. As technology continues to improve, the demand for AI virtual assistants is expected to increase in the coming years. It is often difficult to test various scenarios in which a user may make a command in a given environment. For example, a user may give a spoken command or make a hand gesture while walking toward or away from the AI virtual assistant. This problem is typically addressed by testing the AI virtual assistant in the development environment, in which the AI virtual assistant is fed a series of commands so that the execution of these commands may be evaluated. However, testing the AI virtual assistant in the development environment fails to consider that the development environment may not match the deployment environment. For example, the deployment environment may be an industrial work floor where multiple workers (i.e., users) may be moving around, speaking, and performing different activities. It may therefore be imperative to have a system in place to test multiple scenarios in a particular deployment environment such that failures to execute the commands may be addressed. Thus, embodiments of the present invention may provide advantages including, but not limited to, testing multiple scenarios in a particular deployment environment, customizing an AI virtual assistant for use in a particular deployment environment, and proactively addressing failures to execute any commands. The present invention does not require that all advantages need to be incorporated into every embodiment of the invention.

According to at least one embodiment, when a plurality of users are interacting with an AI virtual assistant, a digital model associated with each user may be received. Upon receiving the digital model, one or more characteristics of the digital model may be identified in order to execute a simulation of movements and activities for the digital model based on the one or more identified characteristics. A set of commands to be asked by the digital model may be created in the simulation so that the set of commands may be provided to the AI virtual assistant. According to at least one embodiment, the set of commands may be a set of voice commands. According to at least one other embodiment, the set of commands may be a set of facial and/or hand gestures. According to at least one further embodiment, the set of commands may be a combination of the voice commands and the gestures. In response to determining the AI virtual assistant is not able to execute each command of the set of commands, the digital model for each user whose command was not able to be executed may be identified in order to recommend one or more corrective actions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to execute a simulation of movements and activities for a digital model associated with a user and, accordingly, recommend a corrective action if an AI virtual assistant is not able to execute a command from the digital model.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an AI auto-adaptation program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502*a* and external components 504*a*, respectively.

The server computer 112 may be a laptop computer, netbook computer, personal computer (PC), a desktop computer, or any programmable electronic device or any network of programmable electronic devices capable of hosting and running an AI auto-adaptation program 110B and a database 116 and communicating with the client computing device 102 and IoT Device 118 via the communication network 114, in accordance with embodiments of the invention. As will be discussed with reference to FIG. 5, the server computer 112 may include internal components 502*b* and external components 504*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 includes an AI virtual assistant device, such as headsets and smart glasses with a virtual assistant built-in, wireless display devices, and/or any other AI virtual assistant devices known in the art for receiving and executing a command from a user that is capable of connecting to the communication network 114, and transmitting and receiving data with the client computing device 102 and the server 112.

According to the present embodiment, the AI auto-adaptation program 110A, 110B may be a program capable of receiving a digital model associated with a user, executing a simulation of movements and activities for the digital model associated with the user, recommending a corrective action if an AI virtual assistant is not able to execute a command from the digital model, testing multiple scenarios in a particular deployment environment, customizing an AI virtual assistant for use in the particular deployment environment, and proactively addressing failures to execute any commands. The AI auto-adaptation method is explained in further detail below with respect to FIG. 2.

Figure 2:
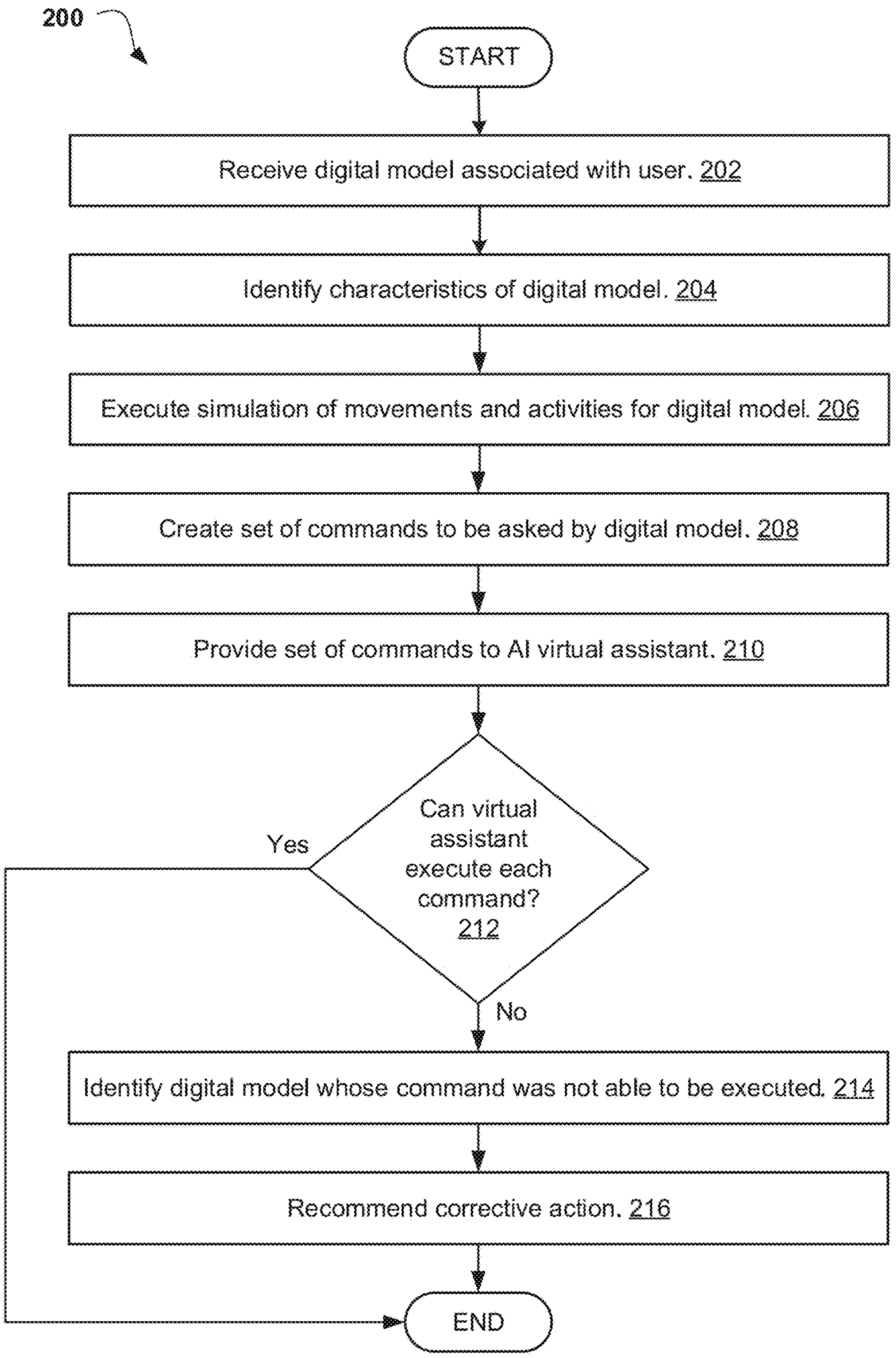
FIG. 2 illustrates an operational flowchart for automatically adapting an artificial intelligence (AI) system from a first environment to a second environment in an AI system adaptation process according to at least one embodiment.

Referring now to FIG. 2, an operational flowchart for automatically adapting an AI system from a first environment to a second environment in an AI system adaptation process 200 is depicted according to at least one embodiment. At 202, the AI auto-adaptation program 110A, 110B receives the digital model associated with each user of the plurality of users. Using the software program 108 on the client computing device 102, the digital model associated with each user may be received. The digital model may be received from a digital twin library. According to at least one embodiment, the digital model may be a model of a human user, described in further detail below with respect to FIG. 3. For example, the human user may be an employee in a manufacturing facility. According to at least one other embodiment, the digital model may be a model of a robotic user, also described in further detail below with respect to FIG. 3. For example, the manufacturing facility described above may be an automated facility. In either embodiment, the AI auto-adaptation program 110A, 110B may identify the requisite number of digital models. The requisite number of digital models may be identified based on historical data of the number of human and/or robotic users that typically work in a given environment (e.g., on the floor of the manufacturing facility). According to at least one further embodiment, the digital model may also be a model of a machine (e.g., a piece of factory equipment), device, and/or any other structure known in the art for which a digital twin may be created.

Then, at 204, the AI auto-adaptation program 110A, 110B identifies the one or more characteristics of the digital model. The one or more characteristics may be identified for each user of the plurality of users. Examples of characteristics include, but are not limited to, typical mobility patterns of the human and/or robotic users for whom the digital models are based (e.g., where the human and/or robotic users usually move on the floor of the manufacturing facility, such as from point A to point B), typical activities performed by the human and/or robotic users for whom the digital models are based (e.g., whether the human and/or robotic users usually stand, sit, walks around, or read on the floor of the manufacturing facility), and typical interactions of the human and/or robotic users for whom the digital models are based (e.g., whether the human and/or robotic users usually speak or perform gestures while on the floor of the manufacturing facility). These characteristics may be utilized to execute the simulation for each digital model, described in further detail below with respect to step 206.

Next, at 206, the AI auto-adaptation program 110A, 110B executes the simulation of the movements and activities for the digital model. The simulation is executed based on the one or more identified characteristics. In this manner, a virtual simulation of the digital models may adhere to reality.

It may be appreciated that in embodiments of the present invention, the simulation may be executed in a manner consistent with the actual environment in which the AI virtual assistant will be deployed. Continuing the example above where the deployment environment is a manufacturing facility, the human and/or robotic users may be moving in different directions on the floor of the manufacturing facility. While performing a voice command in the actual deployment environment, the human and/or robotic user may either be walking toward the AI virtual assistant or away from the AI virtual assistant. Thus, the Doppler effect may cause a change in the sound observed by the AI virtual assistant. Additional details on the Doppler effect are described in further detail below with respect to FIG. 4.

In addition, the human and/or robotic users may be talking over each other or issuing simultaneous commands in the actual deployment environment, in which case interference may result. In this instance, the voice command may not reach the AI virtual assistant because of the interference. Thus, in the simulation, the AI auto-adaptation program 110A, 110B may define an audible boundary for the AI virtual assistant, where commands may be expected to be executed. This audible boundary may be modified upon completion of the simulation, described in further detail below with respect to step 216.

As described above, the virtual simulation of the digital models may adhere to reality. Thus, the AI auto-adaptation program 110A, 110B executes the simulation of movements for each digital model. For example, if the human and/or robotic users typically move from point A to point B on the floor of the manufacturing facility, the digital models associated with each user may perform similar movements. According to at least one embodiment, the simulation of movements may include a multi-directional movement of each digital model. For example, the digital models may move from point A to point B, then to point C and back to point A.

In the present embodiment, the various combinations of scenarios which can be simulated are calculated as follows: $nC0+nC1+ \ldots +nCn=2^{n-1}$, where n represents the number of human and/or robotic users to be considered, and C represents the number of possible combinations. Elaborating on this formula, the combinations of activities may be calculated as follows: $n\times(aC0+aC1+aC2+ \ldots +aCa)=n\times(2^{a-1})$, where a represents the number of possible activities. The combinations of movements may be calculated as follows: $n\times(mC0+mC1+mC2+ \ldots +mCm)=n\times(2^{m-1})$, where m represents the number of possible movements.

Then, at 208, the AI auto-adaptation program 110A, 110B creates the set of commands to be asked by the digital model. It may be appreciated that the set of commands are created in the simulation (i.e., the digital models will issue the commands, described in further detail below with respect to step 210). The created set of commands may be commands that could be issued by the human and/or robotic user in the actual deployment environment. For example, the set of commands may be created in accordance with the number of digital models, and the activities and movements which could be performed in the actual deployment environment. In order to adhere to realistic deployment environment conditions, each digital model may issue commands using different gestures and using different tones and textures of voice. For example, one voice may be louder than another and one voice may be faster than another.

According to at least one embodiment, the set of commands may be a set of voice commands. For example, the command may be spoken by the digital model in the simulated environment. Continuing the example, the digital model may say, "Stamp this piece of metal." The spoken command may also be a question, where the digital model may say, "What is the temperature reading of Machine A?"

According to at least one other embodiment, the set of commands may be a set of facial and/or hand gestures. For example, the digital model may nod their head in an upward motion to activate the AI virtual assistant. Continuing the example, the digital model may waive their hand or give a thumbs-up gesture to activate the AI virtual assistant.

According to at least one further embodiment, the set of commands may be a combination of the voice commands and the gestures. For example, the digital model may waive their hand while issuing a voice command or question.

Then, at 210, the AI auto-adaptation program 110A, 110B provides the set of commands to the AI virtual assistant. It may be appreciated that the set of commands are provided to the AI virtual assistant in the simulation. As described above, the AI virtual assistant may be any AI virtual assistant device or software application known in the art for receiving and executing a command from a user. Continuing the example above where the deployment environment is a manufacturing facility, the AI virtual assistant may be embedded in a piece of equipment in the facility or may be a separate hardware device external to the piece of equipment. Additionally, when the set of commands are provided to the AI virtual assistant, background noise (e.g., the humming of a machine), may also be simulated in the simulated environment.

As described above with respect to step 208, each digital model may issue commands using different gestures and using different tones and textures of voice. The gestures and voice commands may be issued from different positions in the simulated environment and while the digital models are performing various activities. For example, one digital model may issue a voice command while sitting near one corner of the floor, and another digital model may issue a voice command while standing near an opposite corner of the floor. In embodiments of the present invention, each voice command of the set of commands may be provided to the AI virtual assistant at a sound level consistent with the Doppler effect, described in further detail below with respect to FIG. 4. For example, the voice command issued by one digital model may be issued while the digital model is walking toward the AI virtual assistant. Continuing the example, the voice command issued by another digital model may be issued while the digital model is walking away from the AI virtual assistant. Therefore, consistent with the Doppler effect, the voice command issued by the digital model that is walking toward the AI virtual assistant may be provided to the AI virtual assistant at a sound level louder than that of the voice command issued by the other digital model that is walking away from the AI virtual assistant.

According to at least one embodiment, the voice commands, gestures, and combinations of voice commands and gestures, may be provided to the AI virtual assistant either sequentially or simultaneously. For example, in the actual deployment environment, the human and/or robotic user may issue commands simultaneously, such as in a busy manufacturing environment.

Next, at 212, the AI auto-adaptation program 110A, 110B determines whether the AI virtual assistant is able to execute each command of the set of commands. When the set of commands are provided to the AI virtual assistant, the AI auto-adaptation program 110A, 110B may identify the digital model that is issuing each command. Each digital model may be identified at least by metadata upon being received from the digital twin library.

According to at least one embodiment, the AI virtual assistant may not be able to execute each command due to a lack of resources to execute the command. Continuing the example above where the digital model may say, "What is the temperature reading of Machine A?", Machine A may not have the requisite gauge to obtain an accurate temperature reading. In this example, the response from the AI virtual assistant may be a verbal indication message that Machine A does not have the proper gauge. Furthermore, the AI virtual assistant may respond with a follow-up corrective action, described in further detail below with respect to step 216.

According to at least one other embodiment, the AI virtual assistant may not be able to execute each command due to obstructions in the simulated environment. For example, in the simulated environment, the digital twin of a robotic user or some other piece of equipment may be blocking a sensor of the AI virtual assistant. In this example, the AI virtual assistant may not be able to detect any facial or hand gestures. Continuing the example, the sensor may detect a portion of the head or hand of the digital model, but this portion may not be enough to recognize a definitive gesture.

According to at least one further embodiment, the AI virtual assistant may not be able to execute each command due to noise conditions in the simulated environment. For example, in the simulated environment, the digital model may be speaking softly while walking away from the AI virtual assistant. In this example, the AI virtual assistant may only detect a muffled voice and may not be able to interpret the voice command. In another example, the humming of machines in the manufacturing facility may interfere with a voice command issued by the digital model. In this example, the AI virtual assistant may not be able to interpret the voice command. In yet another example, two or more digital models may issue a voice command simultaneously, and the simultaneous voice commands may interfere with each other, or the AI virtual assistant may incorrectly prioritize one voice command over the other.

In any of the above embodiments, a test case validation engine of the AI auto-adaptation program 110A, 110B, described in further detail below with respect to FIG. 3, may evaluate how the AI virtual assistant is responding to the voice commands and/or gestures. If the evaluated response from the AI virtual assistant is not able to be executed, the corrective action may be recommended, described in further detail below with respect to step 216.

In response to determining the AI virtual assistant is not able to execute each command, (step 212, "No" branch), the AI system adaptation process 200 proceeds to step 214 to identify the digital model for each user whose command was not able to be executed. In response to determining the AI virtual assistant is able to execute each command (step 212, "Yes" branch), the AI system adaptation process 200 ends, since the AI virtual assistant may be implemented in the actual deployment environment as is (i.e., with no corrective actions).

Then, at 214, the AI auto-adaptation program 110A, 110B identifies the digital model for each user whose command was not able to be executed. As described above with respect to step 212, each digital model may be identified at least by metadata upon being received from the digital twin library. Thus, when the test case validation engine determines the command of a digital model is not able to be executed, that digital model whose command was not able to be executed may be identified by the AI auto-adaptation program 110A, 110B.

Next, at 216, the AI auto-adaptation program 110A, 110B recommends the one or more corrective actions. The one or more corrective actions are recommended such that each command of the set of commands is able to be executed. The one or more corrective actions may be recommend to a site manager and/or administrator prior to the implementation of the AI virtual assistant in the actual deployment environment.

According to at least one embodiment, the AI auto-adaptation program 110A, 110B may execute an additional simulation of the movements and activities for the digital model to predict a proper corrective action. For example, the additional simulation may simulate alternative voice command and/or gesture capture scenarios for each digital model whose commands were not able to be executed. Continuing the example, the alternative capture scenario may be to add additional microphones or to modify a location of a microphone in the additional simulated environment to capture the voice command of the digital model. Similarly, the alternative capture scenario may be to add additional sensors or to modify a location of a sensor in the additional simulated environment to capture the gestures of the digital model. An additional command may be created based on the additional simulation. For example, the additional command may be a voice command and/or gesture issued by the digital model in the simulated environment with the added microphones and/or sensors. If the additional command is able to be executed by the AI virtual assistant, then the proper corrective actions may be identified and recommended. Once the one or more corrective actions have been applied in the actual deployment environment, the AI virtual assistant may be updated and implemented in the actual deployment environment.

Examples of the one or more corrective actions include, but are not limited to, adding one or more additional microphones in a surrounding environment (i.e., the actual deployment environment), adding one or more sensors in the surrounding environment, modifying a location of a microphone in the surrounding environment, modifying a location of a sensor in the surrounding environment, and installing one or more additional gauges on a piece of equipment in the surrounding environment.

Figure 3:
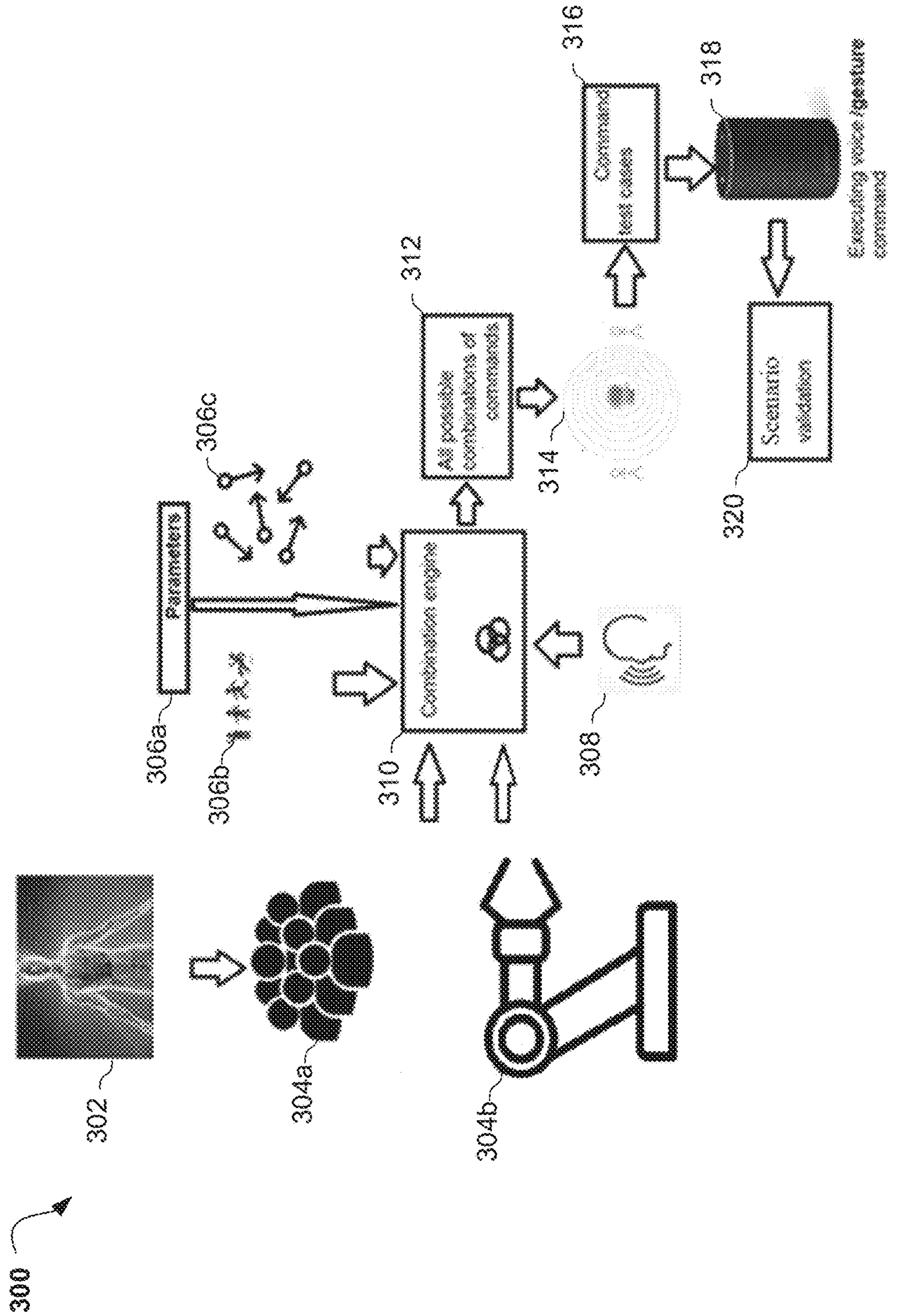
FIG. 3 is a diagram depicting an interaction between solution components of the process in FIG. 2 according to at least one embodiment.

Referring now to FIG. 3, a diagram 300 depicting an interaction between solution components of the process in FIG. 2 is shown according to at least one embodiment. In the diagram 300, a virtual library 302 of digital twins is illustrated. A plurality of digital models of human users 304*a* may be received from the virtual library 302. In some embodiments of the present invention, one or more digital models of robotic users 304*b* may be received from the virtual library 302 in addition to, or instead of, the digital models of human users 304*a*. For example, a manufacturing facility may be completely automated. The parameters 306*a* (i.e., the facial and/or hand gestures), the activities 306*b*, and the movements 306*c* of the digital models 304*a*, 304*b*, along with the set of voice commands 308 may be fed to a combination engine 310. The combination engine 310 may then execute the simulation of the digital models 304*a*, 304*b* performing the activities 306*b* and the movements 306*c* while issuing the set of voice commands 308 and the facial and/or hand gestures. The combination engine 310 may output all of the possible combinations of the voice commands and the facial and/or hand gestures 312. All of the possible combinations of the voice commands and the facial and/or hand gestures 312 may then, in accordance with the Doppler effect 314, be provided as test cases 316 to the AI virtual assistant 318. The AI virtual assistant 318 may attempt to execute all of the possible combinations of the voice commands and the facial and/or hand gestures 312, and a test case validation engine 320 may evaluate how the AI virtual assistant 318 is responding to all of the possible combinations of the voice commands and the facial and/or hand gestures 312. The test case validation engine 320 may evaluate whether the AI virtual assistant 318 was able to execute and prioritize all of the possible combinations of the voice commands and the facial and/or hand gestures 312. For example, if the digital models 304*a*, 304*b* issue simultaneous commands, it may be necessary, based on a predefined sequence of operations, to prioritize one command over another. If the response of the AI virtual assistant 318 is unsatisfactory, the one or more corrective actions may be recommended.

Figure 4:
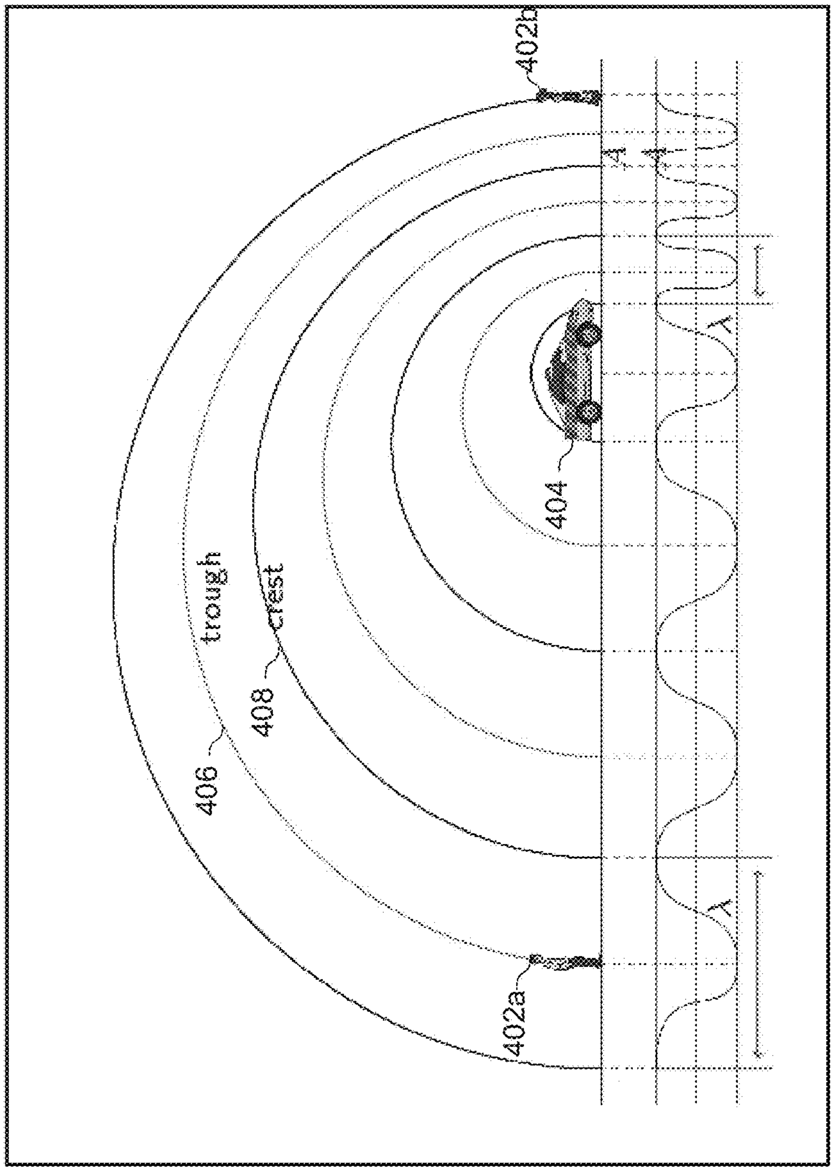
FIG. 4 is a diagram depicting an example of the Doppler effect of sound according to at least one embodiment.

Referring now to FIG. 4, a diagram 400 depicting an example of the Doppler effect of sound is shown according to at least one embodiment. In the diagram 400, a first user 402*a* is standing in a first position and a second user 402*b* is standing in a second position. A sound source 404 may be moving away from the first user 402*a* and toward the second user 402*b*. Thus, the sound emanating from the sound source 404 will be louder from the perspective of the second user 402*b* and softer from the perspective of the first user 402*a*. This result is known as the Doppler effect. As illustrated in the diagram 400, a wavelength A of a sound wave will be longer at the first position and shorter at the second position, while the amplitude A remains the same at the first position and the second position. A trough 406 (i.e., the lowest point on a wave) and a crest 408 (i.e., the highest point on a wave) occur closer together at the second position and farther apart at the first position, resulting in a louder sound experienced by the second user 402*b*. The simulation described above with respect to FIGS. 2 and 3 is performed in accordance with the Doppler effect.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
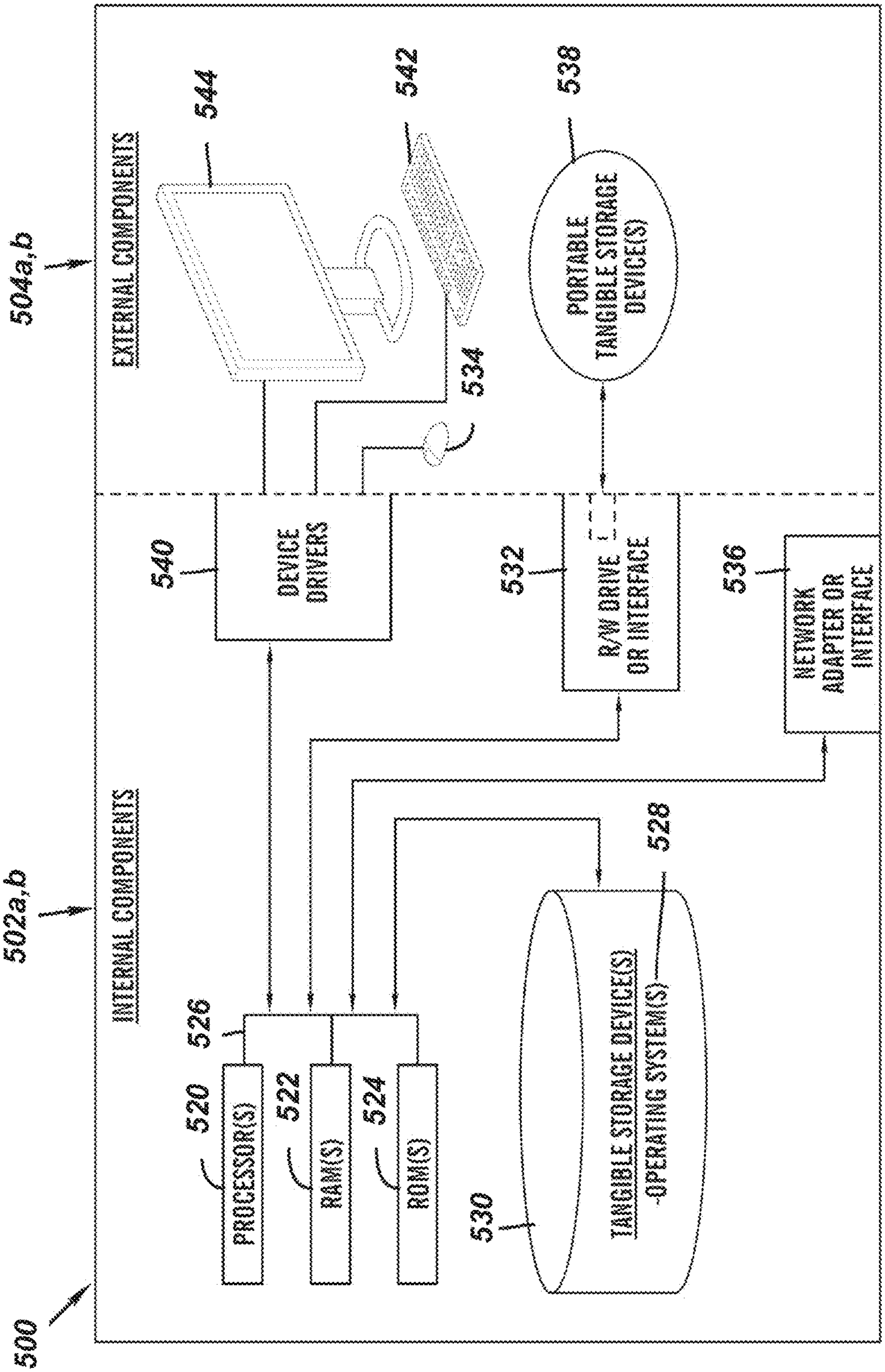
FIG. 5 is a functional block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 *a,b* and external components 504 *a,b* illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the AI auto-adaptation program 110A in the client computing device 102 and the AI auto-adaptation program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 *a,b* also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the AI auto-adaptation program 110A, 110B, can be stored on one or more of the respective portable computer-readable tangible storage devices 538, read via the respective R/W drive or interface 532, and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. The software program 108 and the AI auto-adaptation program 110A in the client computing device 102 and the AI auto-adaptation program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the AI auto-adaptation program 110A in the client computing device 102 and the AI auto-adaptation program 110B in the server 112 are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
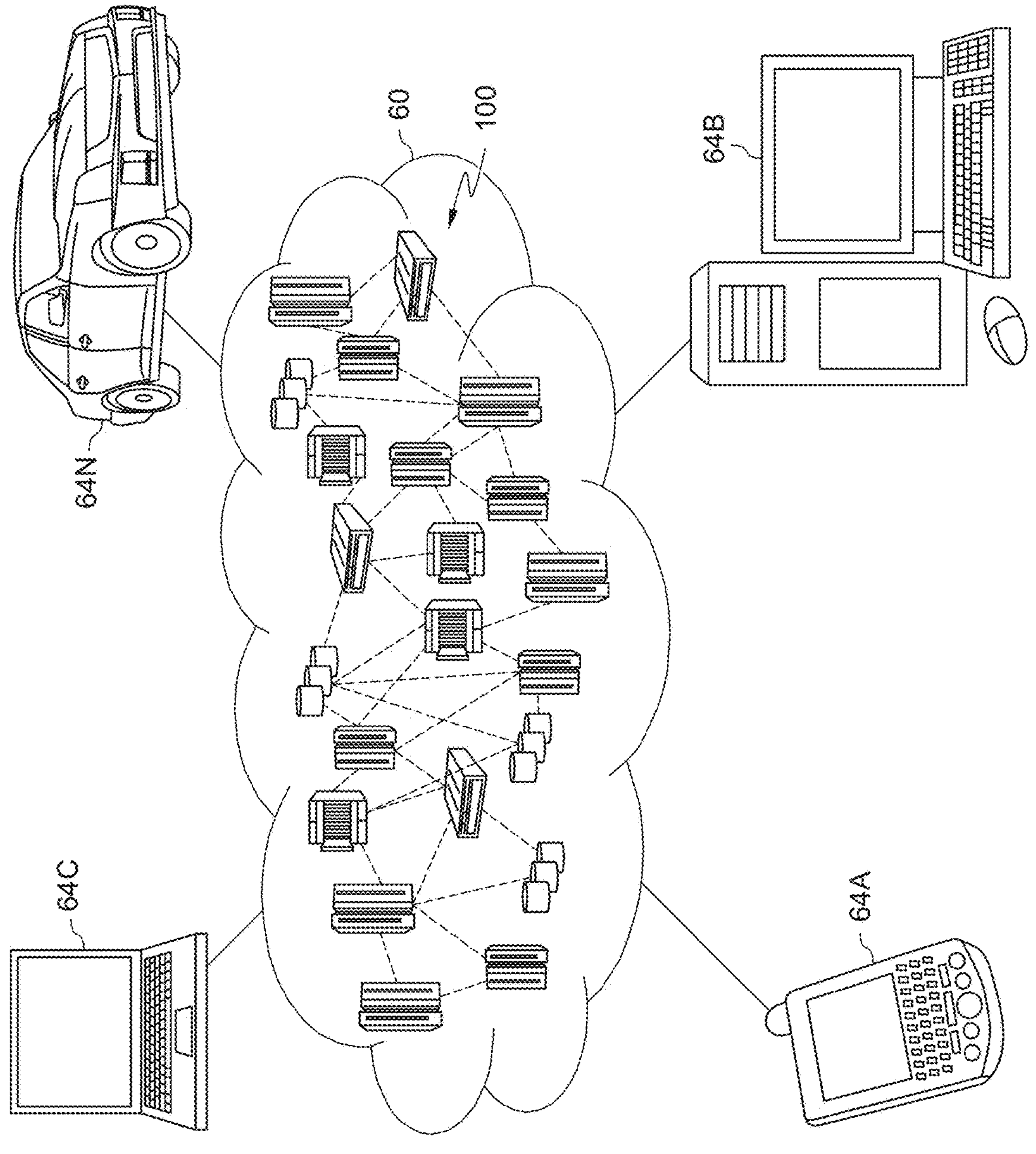
FIG. 6 depicts a cloud computing environment according to an embodiment of the present invention.

Referring now to FIG. 6, illustrative cloud computing environment 60 is depicted. As shown, cloud computing environment 60 comprises one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Figure 7:
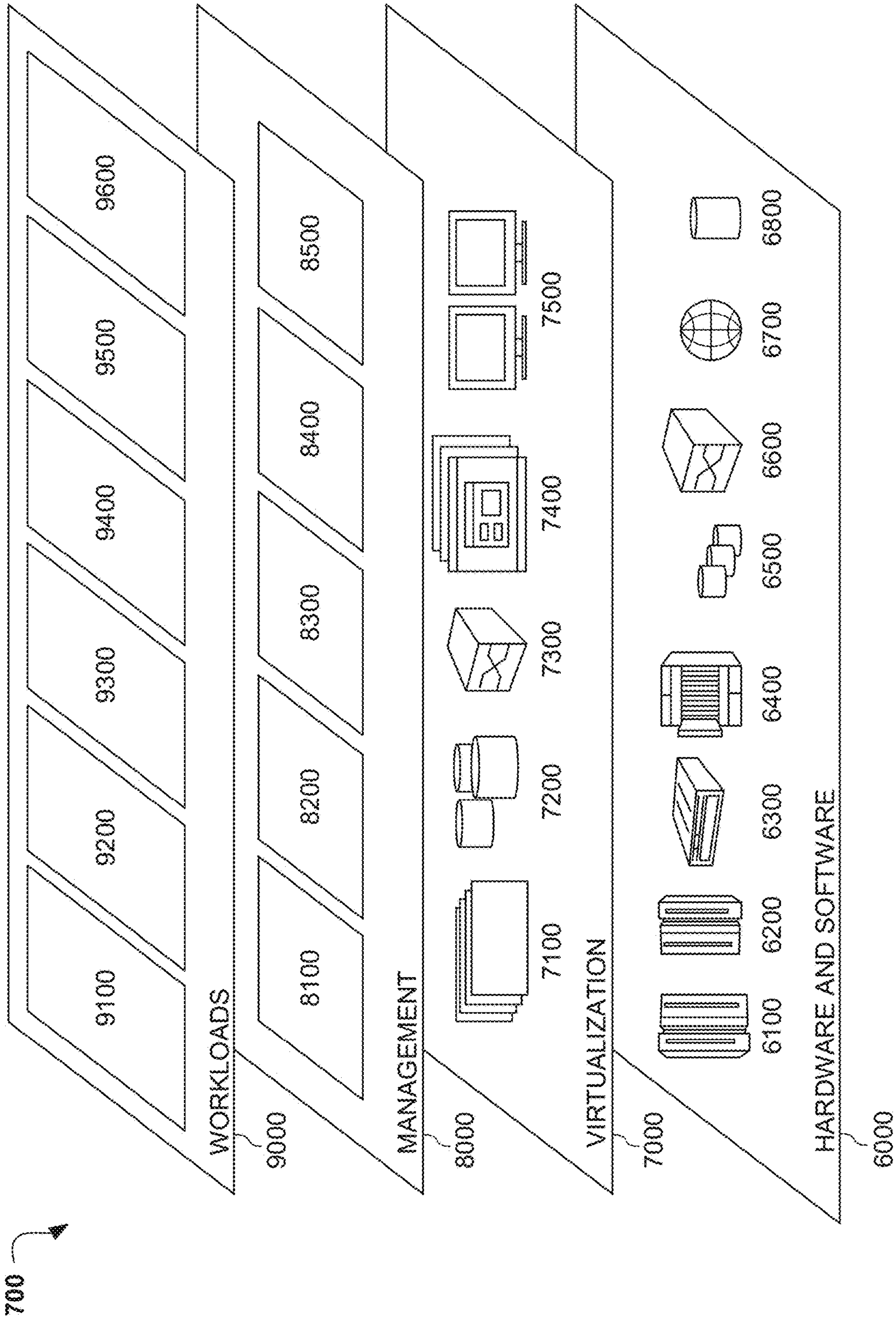
FIG. 7 depicts abstraction model layers according to an embodiment of the present invention.

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and automatically adapting an AI system from a first environment to a second environment 9600. Automatically adapting an AI system from a first environment to a second environment 9600 may relate to executing a simulation of movements and activities for a digital model associated with a user in order to recommend a corrective action if an AI virtual assistant is not able to execute a command from the digital model.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of automatically adapting an artificial intelligence (AI) system from a first environment to a second environment, the method comprising:

receiving a digital twin model associated with each user of a plurality of users, wherein the digital twin model associated with each user at least includes a first digital twin model of a first human user and a second digital twin model of a second robotic user, wherein the first digital twin model and the second digital twin model are virtual representations of the first user and the second user, respectively;

identifying one or more characteristics of the digital twin model;

executing a digital twin simulation of movements and activities for the digital twin model based on the one or more identified characteristics, wherein executing of the digital twin simulation includes the first digital twin model generating simulated physical movements and voice of the first user operating in the second environment simultaneously with the second digital twin model generating simulated physical movements and voice of the second user operating in the second environment, wherein the executed digital twin simulation is a virtual simulation, wherein the executed digital twin simulation includes the first digital twin model walking towards an AI virtual assistant and the second digital twin model walking away from the AI virtual assistant;

creating a set of commands to be asked by the digital twin model in the digital twin simulation;

providing the set of commands to the AI virtual assistant in the digital twin simulation, wherein providing the set of commands to the AI virtual assistant includes the first digital twin model generating a sound level for a first voice command consistent with a Doppler effect corresponding to the first digital twin model walking towards the AI virtual assistant issuing the first voice command and the second digital twin model generating a sound level for a second voice command consistent with the Doppler effect corresponding to the second digital twin model walking away from the AI virtual assistant issuing the second voice command, the sound level for the first voice command and the sound level for the second voice command further being generated based on different tones and textures associated with the first digital twin model and the second digital twin model, wherein the Doppler effect causes a change in sound levels observed by the AI virtual assistant, wherein the first voice command talking over the second voice command creates an interference between the first voice command and the second voice command;

determining whether the AI virtual assistant is able to execute each command of the set of commands in the digital twin simulation;

in response to determining the AI virtual assistant is not able to execute each command, identifying the digital twin model for each user whose command was not able to be executed; and recommending one or more corrective actions such that each command of the set of commands is able to be executed, wherein recommending the one or more corrective actions includes executing an additional digital twin simulation in which an alternative capture scenario is simulated for each digital twin model whose command was not able to be executed, wherein the alternative capture scenario includes adding one or more additional microphones in the additional digital twin simulation, and wherein executing the additional digital twin simulation includes issuing, by each digital twin model whose command was not able to be executed based on the additional digital twin simulation, a new voice command with the one or more additional microphones added.

2. The method of claim 1, wherein the corrective action is selected from a group consisting of adding the one or more additional microphones in a surrounding environment, adding one or more sensors in the surrounding environment, and installing one or more additional gauges on a piece of equipment in the surrounding environment.

3. The method of claim 1, wherein the digital twin model is received from a digital twin library.

4. The method of claim 1, wherein the simulation of the movements and activities includes multi-directional movements of each digital twin model.

5. The method of claim 1, wherein responsive to the first digital twin model issuing the first voice command simultaneously with the second digital twin model issuing the second voice command to the AI virtual assistant, prioritizing based on a pre-defined sequence of operations, one of the first voice command and the second voice command.

6. A computer system, the computer system comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

receiving a digital twin model associated with each user of a plurality of users, wherein the digital twin model associated with each user at least includes a first digital twin model of a first human user and a second digital twin model of a second robotic user, wherein the first digital twin model and the second digital twin model are virtual representations of the first user and the second user, respectively;

identifying one or more characteristics of the digital twin model;

executing a digital twin simulation of movements and activities for the digital twin model based on the one or more identified characteristics, wherein executing of the digital twin simulation includes the first digital twin model generating simulated physical movements and voice of the first user operating in the second environment simultaneously with the second digital twin model generating simulated physical movements and voice of the second user operating in the second environment, wherein the executed digital twin simulation is a virtual simulation, wherein the executed digital twin simulation includes the first digital twin model walking towards an AI virtual assistant and the second digital twin model walking away from the AI virtual assistant;

creating a set of commands to be asked by the digital twin model in the digital twin simulation;

providing the set of commands to the AI virtual assistant in the digital twin simulation, wherein providing the set of commands to the AI virtual assistant includes the first digital twin model generating a sound level for a first voice command consistent with a Doppler effect corresponding to the first digital twin model walking towards the AI virtual assistant issuing the first voice command and the second digital twin model generating a sound level for a second voice command consistent with the Doppler effect corresponding to the second digital twin model walking away from the AI virtual assistant issuing the second voice command, the sound level for the first voice command and the sound level for the second voice command further being generated based on different tones and textures associated with the first digital twin model and the second digital twin model, wherein the Doppler effect causes a change in sound levels observed by the AI virtual assistant, wherein the first voice command talking over the second voice command creates an interference between the first voice command and the second voice command;

determining whether the AI virtual assistant is able to execute each command of the set of commands in the digital twin simulation;

in response to determining the AI virtual assistant is not able to execute each command, identifying the digital twin model for each user whose command was not able to be executed; and recommending one or more corrective actions such that each command of the set of commands is able to be executed, wherein recommending the one or more corrective actions includes executing an additional digital twin simulation in which an alternative capture scenario is simulated for each digital twin model whose command was not able to be executed, wherein the alternative capture scenario includes adding one or more additional microphones in the additional digital twin simulation, and wherein executing the additional digital twin simulation includes issuing, by each digital twin model whose command was not able to be executed based on the additional digital twin simulation, a new voice command with the one or more additional microphones added.

7. The computer system of claim 6, wherein the corrective action is selected from a group consisting of adding the one or more additional microphones in a surrounding environment, adding one or more sensors in the surrounding environment, and installing one or more additional gauges on a piece of equipment in the surrounding environment.

8. The computer system of claim 6, wherein the digital twin model is received from a digital twin library.

9. The computer system of claim 6, wherein the simulation of the movements and activities includes multi-directional movements of each digital twin model.

10. The computer system of claim 6, wherein responsive to the first digital twin model issuing the first voice command simultaneously with the second digital twin model issuing the second voice command to the AI virtual assistant, prioritizing based on a pre-defined sequence of operations, one of the first voice command and the second voice command.

11. A computer program product, the computer program product comprising:

one or more computer-readable tangible storage media and program instructions stored on at least one of the one or more computer-readable tangible storage media, the program instructions executable by a processor capable of performing a method, the method comprising:

receiving a digital twin model associated with each user of a plurality of users, wherein the digital twin model associated with each user at least includes a first digital twin model of a first human user and a second digital twin model of a second robotic user, wherein the first digital twin model and the second digital twin model are virtual representations of the first user and the second user, respectively;

identifying one or more characteristics of the digital twin model;

executing a digital twin simulation of movements and activities for the digital twin model based on the one or more identified characteristics, wherein executing of the digital twin simulation includes the first digital twin model generating simulated physical movements and voice of the first user operating in the second environment simultaneously with the second digital twin model generating simulated physical movements and voice of the second user operating in the second environment, wherein the executed digital twin simulation is a virtual simulation, wherein the executed digital twin simulation includes the first digital twin model walking towards an AI virtual assistant and the second digital twin model walking away from the AI virtual assistant;

creating a set of commands to be asked by the digital twin model in the digital twin simulation;

providing the set of commands to the AI virtual assistant in the digital twin simulation, wherein providing the set of commands to the AI virtual assistant includes the first digital twin model generating a sound level for a first voice command consistent with a Doppler effect corresponding to the first digital twin model walking towards the AI virtual assistant issuing the first voice command and the second digital twin model generating a sound level for a second voice command consistent with the Doppler effect corresponding to the second digital twin model walking away from the AI virtual assistant issuing the second voice command, the sound level for the first voice command and the sound level for the second voice command further being generated based on different tones and textures associated with the first digital twin model and the second digital twin model, wherein the Doppler effect causes a change in sound levels observed by the AI virtual assistant, wherein the first voice command talking over the second voice command creates an interference between the first voice command and the second voice command;

determining whether the AI virtual assistant is able to execute each command of the set of commands in the digital twin simulation;

in response to determining the AI virtual assistant is not able to execute each command, identifying the digital twin model for each user whose command was not able to be executed; and recommending one or more corrective actions such that each command of the set of commands is able to be executed, wherein recommending the one or more corrective actions includes executing an additional digital twin simulation in which an alternative capture scenario is simulated for each digital twin model whose command was not able to be executed, wherein the alternative capture scenario includes adding one or more additional microphones in the additional digital twin simulation, and wherein executing the additional digital twin simulation includes issuing, by each digital twin model whose command was not able to be executed based on the additional digital twin simulation, a new voice command with the one or more additional microphones added.

12. The computer program product of claim 11, wherein the corrective action is selected from a group consisting of adding one or more additional microphones in a surrounding environment, adding one or more sensors in the surrounding environment, and installing one or more additional gauges on a piece of equipment in the surrounding environment.

13. The computer program product of claim 11, wherein the digital twin model is received from a digital twin library.

14. The computer program product of claim 11, wherein responsive to the first digital twin model issuing the first voice command simultaneously with the second digital twin model issuing the second voice command to the AI virtual assistant, prioritizing based on a pre-defined sequence of operations, one of the first voice command and the second voice command.

* * * * *